United States Patent
Kim

(10) Patent No.: US 7,667,546 B2
(45) Date of Patent: Feb. 23, 2010

(54) LVDS RECEIVER FOR CONTROLLING CURRENT BASED ON FREQUENCY AND METHOD OF OPERATING THE LVDS RECEIVER

(75) Inventor: Dae-Gyu Kim, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 345 days.

(21) Appl. No.: 11/173,485

(22) Filed: Jun. 30, 2005

(65) Prior Publication Data

US 2006/0002483 A1 Jan. 5, 2006

(30) Foreign Application Priority Data

Jul. 2, 2004 (KR) .................. 10-2004-0051597

(51) Int. Cl.
*H03L 7/00* (2006.01)
(52) U.S. Cl. .......................... 331/16; 331/17
(58) Field of Classification Search ............ 326/82; 331/16–17
See application file for complete search history.

(56) References Cited

U.S. PATENT DOCUMENTS

| | | | |
|---|---|---|---|
| 2,003,303 A * | 6/1935 | Waldemar ............... 204/157.9 |
| 5,987,543 A | 11/1999 | Smith |
| 6,323,695 B1 * | 11/2001 | Heinrich ................. 327/89 |
| 6,373,278 B1 | 4/2002 | Sung et al. |
| 6,392,452 B2 * | 5/2002 | Lee ........................... 327/108 |
| 6,724,230 B2 * | 4/2004 | Hirabayashi ............... 327/280 |
| 6,850,102 B2 * | 2/2005 | Hsu et al. .................. 327/157 |
| 7,030,669 B2 * | 4/2006 | Hulfachor et al. ........... 327/156 |
| 2002/0101289 A1 * | 8/2002 | Maneatis ..................... 331/17 |
| 2003/0227303 A1 * | 12/2003 | Ilchmann et al. ........... 327/108 |
| 2004/0048591 A1 * | 3/2004 | Kim et al. ................. 455/168.1 |

FOREIGN PATENT DOCUMENTS

| | | |
|---|---|---|
| JP | 2002-094360 | 3/2002 |
| KR | 2003-0025389 | 3/2003 |

OTHER PUBLICATIONS

English language abstract of the Korean Publication No. 2003-0025389.
English language abstract of the Japanese Publication No. 2002-094360.

* cited by examiner

*Primary Examiner*—Vibol Tan
*Assistant Examiner*—Matthew C Tabler
(74) *Attorney, Agent, or Firm*—Mills & Onello LLP

(57) ABSTRACT

In an embodiment, an LVDS (Low Voltage Differential Signaling) receiver includes at least one LVDS input buffer, a clock generating unit, and a bias circuit. The clock generating unit includes a voltage controlled oscillator for generating a clock signal tracking a frequency of data received via the at least one LVDS input buffer based on a control voltage. The bias circuit controls current sources that supply current to at least one differential amplifier in the at least one LVDS input buffer based on the control voltage of the clock signal generating unit. Therefore, the LVDS receiver can save current consumed in LVDS input buffers by controlling the amount of current supplied to the at least one differential amplifier included in the at least one LVDS input buffers.

25 Claims, 9 Drawing Sheets

LVDS RECEIVER FOR CONTROLLING CURRENT BASED ON FREQUENCY AND METHOD OF OPERATING THE LVDS RECEIVER

CLAIM FOR PRIORITY

This application claims priority from Korean Patent Application No. 2004-51597 filed on Jul. 2, 2004 in the Korean intellectual property Office (KIPO), the entire contents of which are hereby incorporated by reference.

BACKGROUND OF THE INVENTION

1. Field of the Invention

The present invention relates in general to an LVDS (Low Voltage Differential Signaling) receiver, and more particularly to an LVDS receiver that controls operating current based on its operating frequency.

2. Description of the Related Art

LVDS (Low Voltage Differential Signaling) is an industry standard that defines high-speed and low power data signaling techniques that are implemented in a variety of connection technologies. The LVDS is defined in ANSI/TIA/EIA-644. The LVDS provides high-speed data transmission with excellent noise immunity by means of differential signals having extremely low voltage levels, for example, 350 mV. Most importantly, the LVDS uses differential signaling for filtering out common mode noise.

The increasing data bandwidth necessary for communication and display applications, for example, has raised the importance of high-speed data signaling between chips, boards, and systems. Good EMI (Electromagnetic Interference) characteristics under a high operating frequency, as well as the strong noise immunity, make the LVDS suitable for such applications.

Because ANSI/TIA/EIA-644 does not specify protocols, connectors, or bus structures of the LVDS, application-specific specifications vary in accordance with the various applications.

Specifically, an application may use an LVDS interface that operates on an input signal with a wide ranging operating frequency. Usually, an LVDS input buffer is designed based on a maximum operating frequency, and thus excessive current is consumed while operating at the normal frequency.

In a display application, EMI characteristics and low power consumption are becoming more important as the resolution and color depth of the display increase. For example, for the display device for a notebook PC and a PDA (Personal Digital Assistants), minimizing the display's power consumption is a first consideration in determining competitiveness of the notebook PC and the PDA. Low power consumption is a key point for increasing battery life span for portable devices that use a limited capacity of batteries.

FIG. 1 is a block diagram illustrating a conventional data transmission between a graphics control unit and a timing control unit via LVDS.

For the sake of generalization, the graphics control unit 110 and the timing control unit 130 can be named differently and can exist as the sub part of any other main components or as any other mixed components.

Referring to FIG. 1, for this example, the graphics control unit 110 converts an analog video signal supplied from a RAMDAC (Random Access Memory Digital Analog Converter) to a digital video signal. In addition, the graphics control unit 110 transmits RGB (Red, Green, Blue) data signals generated from the received analog digital video signal to the timing control unit 130.

FIG. 1 illustrates when a conventional analog video interface is used. When a digital video interface such as DVI (Digital Video Interface) is used, analog-digital converting is not necessary and the function of the graphics control unit 110 may be slightly varied. Returning to the conventional analog video interface as described above, the digital video signal converted by an AD converter 111 is transmitted to the timing control unit 130 via a scaler 112 and an LVDS transmitter 1113.

In the timing control unit 130, an LVDS receiver 131 receives the digital video signal from the LVDS transmitter 1113 and provides a timing controller 132 for the digital video signal. The timing controller 132 provides a column driver and a row driver of an LCD panel 150 with the RGB data signal in response to HSYNC (Horizontal Synchronization) and/or VSYNC (Vertical Synchronization) signals via an RSDS (Reduced Swing Differential Signaling) transmitter 133.

Usually, the LVDS interface is used for the data transmission between the graphics control unit 110 and the timing control unit 130 and may operate on data signals with wide frequency ranges. Because various resolutions and color depths are supported by recent display devices, the data transmission rate of the LVDS interface needs to cover a wide frequency range.

As an example, a display device for a PC (Personal Computer) operates in VGA (Video Graphics Array) mode during a booting sequence, and operates in a display mode with a higher resolution and a color depth set by a user after the booting sequence ends. Moreover, the display mode with the higher resolution is selected when a specific application such as a game, is executed, and after the application the display device returns to the normal display mode. For example, a 25 MHz operation frequency corresponds to a VGA display mode, and a 135 MHz operation frequency to a SXGA (Super Extended Graphics Array) display mode. Therefore, the LVDS transmitter 113 and LVDS receiver 131 need flexibility according to the user's display setting and environmental requirements.

FIG. 2 is a detailed block diagram showing a conventional LVDS transmitter and a conventional LVDS receiver in the graphics control unit and the timing control unit of FIG. 1.

Referring to FIG. 2, the LVDS transmitter 113 and the LVDS receiver 131 may be implemented on different chips. Therefore, a plurality of transmitter chips and receiver chips may be used to implement the LVDS interface between the graphics control unit 110 and the timing control unit 130. For example, additional LVDS transmitters and LVDS receivers may be added in parallel to achieve required data bandwidth.

The LVDS transmitter 113 shown in FIG. 2 has four groups, each having seven channels, totalling twenty eight channels. A serializer 210 converts low speed parallel data of twenty eight channels to four high speed serial data streams. LVDS output buffers 212a, 212b, 212c, and 212d transmit serial data streams to the LVDS receiver 131. Thus, four LVDS output buffers 212a, 212b, 212c and 212d can handle four serial data streams.

A clock generating unit, for example a PLL (Phase Locked Loop)/DLL (Delay Locked Loop) 220, receives a clock signal of the LVDS transmitter 113 and supplies a suitable clock signal to the serializer 210 and LVDS output buffers 212a, 212b, 212c, and 212d. The clock generating unit may include a voltage controlled oscillator with an output frequency controlled by a control voltage. When the LVDS transmitter operating frequency is in a range from 25 MHz to 135 MHz, as mentioned above, the LVDS output buffer's operating frequency may be in a range from 87.5 MHz to 472.5 MHz: when NRZ (Non Return to Zero) coding is used for data transmission, the LVDS output buffer's operating frequency (87.5 MHz~472.5 MHz) is three and half times the LVDS transmitter's operating frequency (25 MHz~135 MHz).

Four LVDS input buffers 231a, 231b, 231c, and 231d receive the data transmitted by the LVDS output buffers 212a, 212b, 212c, and 212d of the LVDS transmitter 113. The operating frequency of the four LVDS input buffers 231a, 231b, 231c, and 231d is identical to that of the LVDS output buffers 212a, 212b, 212c, and 212d. A deserializer 230 converts the four high speed serial data streams received by the four LVDS input buffers 231a, 231b, 231c, and 231d to low speed parallel data of twenty eight channels. The LVDS receiver 131 also includes a clock generating unit 240, such as a PLL or a DLL, that may include a voltage controlled oscillator with an output frequency controlled by a control voltage.

The clock generating unit 220 in the LVDS transmitter 113 and the clock generating unit 240 in the LVDS receiver 131 may communicate with each other via clock output LVDS buffer 221 and clock input LVDS buffer 241 so that the clocks of the clock generating units 220 and 240 are synchronized with each other.

FIG. 3 is a circuit diagram illustrating a conventional rail-to-rail LVDS input buffer.

Referring to FIG. 3, an LVDS input buffer 300 has an N-type differential amplifier 310, a P-type differential amplifier 330, and a comparator 350. The differential amplifier 310 has a first current source 315, and the differential amplifier 330 has a second current source 335. Both the current sources 315 and 335 supply current to the differential amplifiers 310 and 330, respectively. As mentioned earlier, as the operating frequency of the LVDS input buffer 300 increases, the current supplied to both differential amplifiers 310 and 330 should increase. Thus, the first and second current sources 315 and 335 are designed to satisfy the maximum current corresponding to the maximum operating frequency. In this design scheme, when the LVDS input buffer 300 operates at a frequency lower than the maximum frequency, an unnecessarily excessive amount of current is supplied to the LVDS input buffer 300. In applications where a battery's life span is important, this excessive current may be a severe factor for reducing the battery life span.

SUMMARY OF THE INVENTION

Accordingly, embodiments of the present invention substantially obviate one or more problems due to limitations and disadvantages of the related art.

Embodiments of the present invention provide an LVDS receiver that can save current consumption by controlling the amount of the current supplied to LVDS input buffers based on the operating frequency.

Embodiments of the present invention also provide a method of operating an LVDS receiver that can save current consumption by controlling the amount of current supplied to LVDS input buffers based on the operating frequency.

BRIEF DESCRIPTION OF THE DRAWINGS

The above and other features and advantages of the present invention will become more apparent by describing in detail exemplary embodiment thereof with reference to the accompanying drawings, in which.

DETAILED DESCRIPTION OF THE INVENTION

Figure 1:
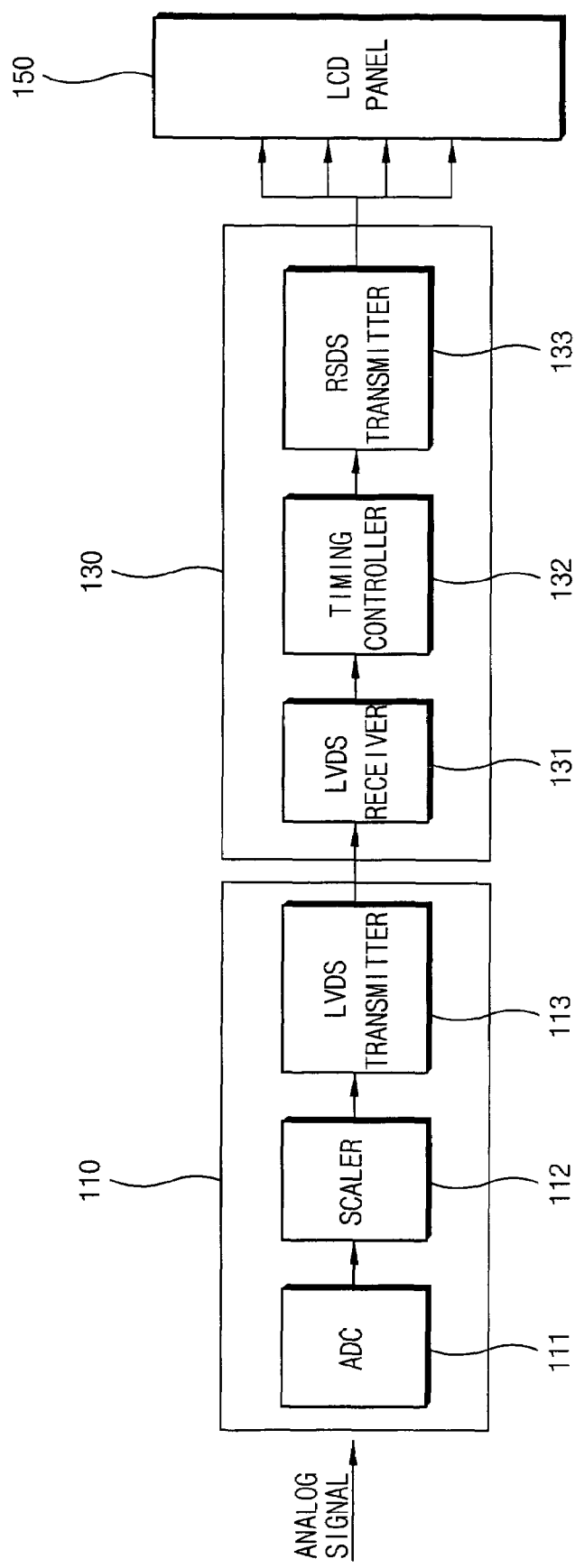
FIG. 1 is a block diagram illustrating a conventional data transmission between a graphics control unit and a timing control unit via LVDS.

Detailed illustrative embodiments of the present invention are disclosed herein. However, specific structural and functional details are merely representative for purposes of describing exemplary embodiment of the present invention. The invention may, however, be embodied in many alternate forms and should not be construed as limited to the embodiments set forth herein.

Accordingly, while the invention is susceptible to various modifications and alternative forms, specific embodiments are shown by way of examples in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

Figure 4A:
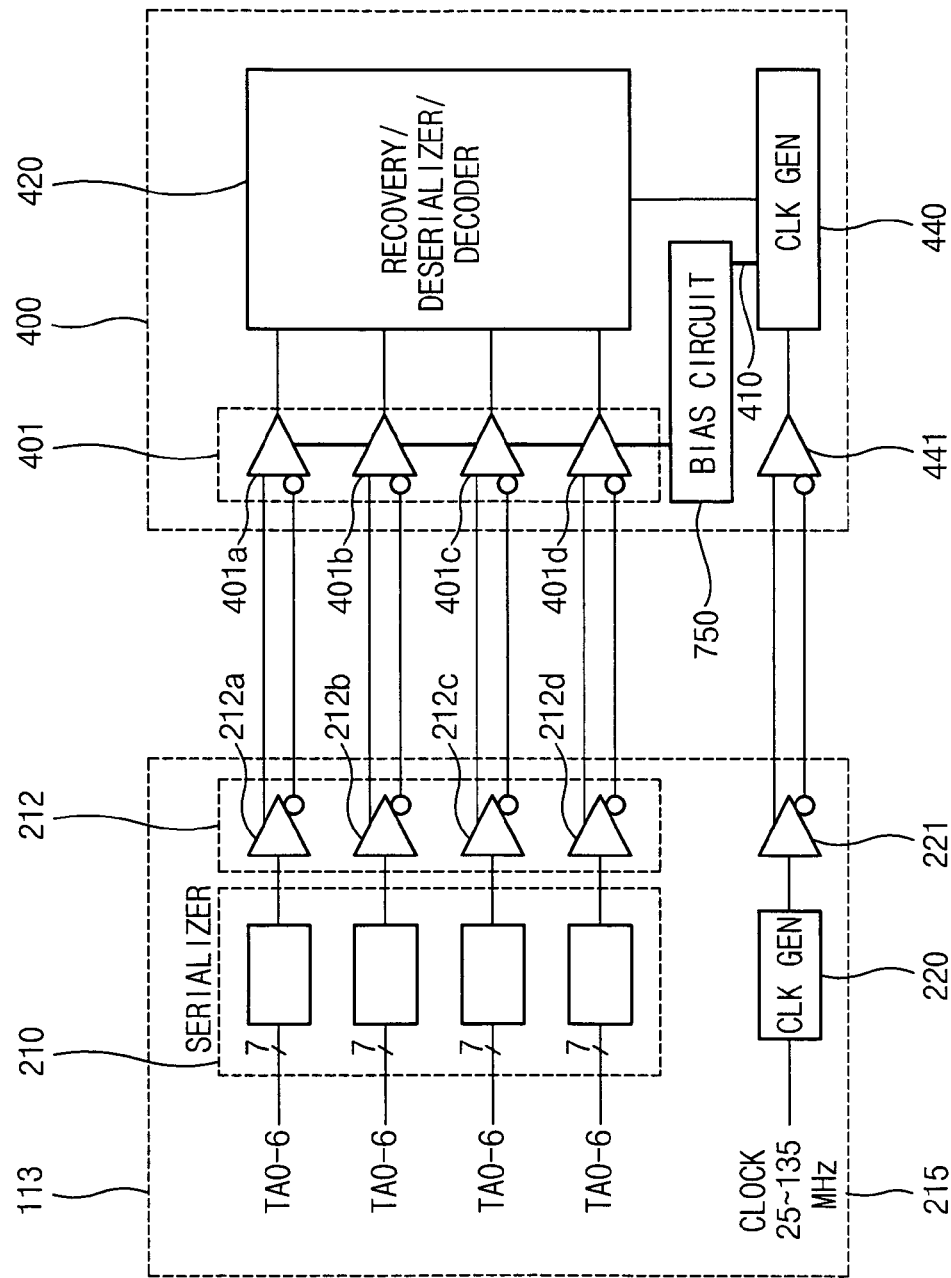
FIG. 4A is a block diagram showing an LVDS transmitter and an LVDS receiver according to an exemplary embodiment of the present invention.

FIG. 4A is a block diagram showing an LVDS transmitter and an LVDS receiver according to an exemplary embodiment of the present invention.

Figure 2:
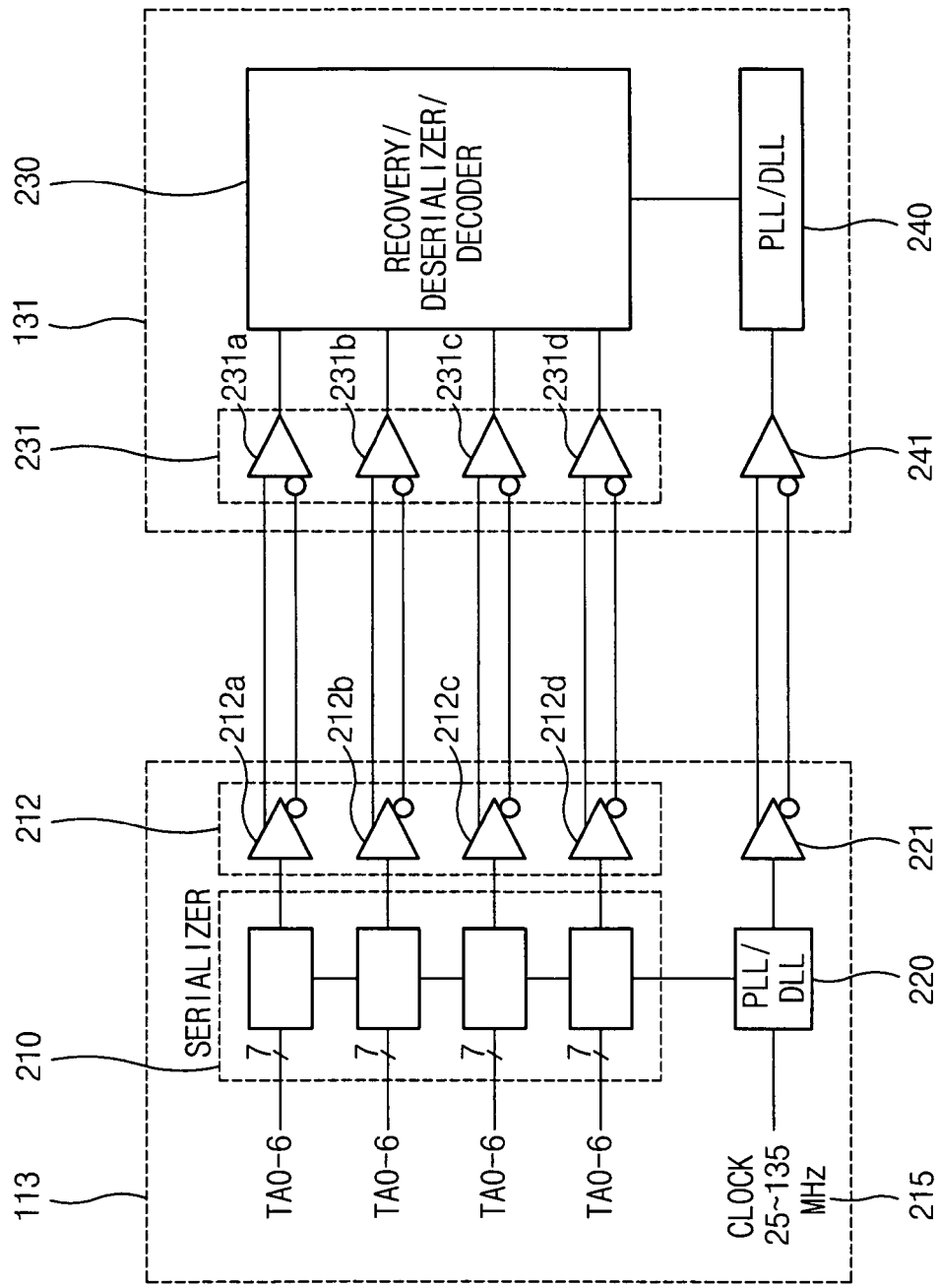
FIG. 2 is a detailed block diagram showing a conventional LVDS transmitter and a conventional LVDS receiver in the graphics control unit and the timing control unit of FIG. 1.
Figure 3:
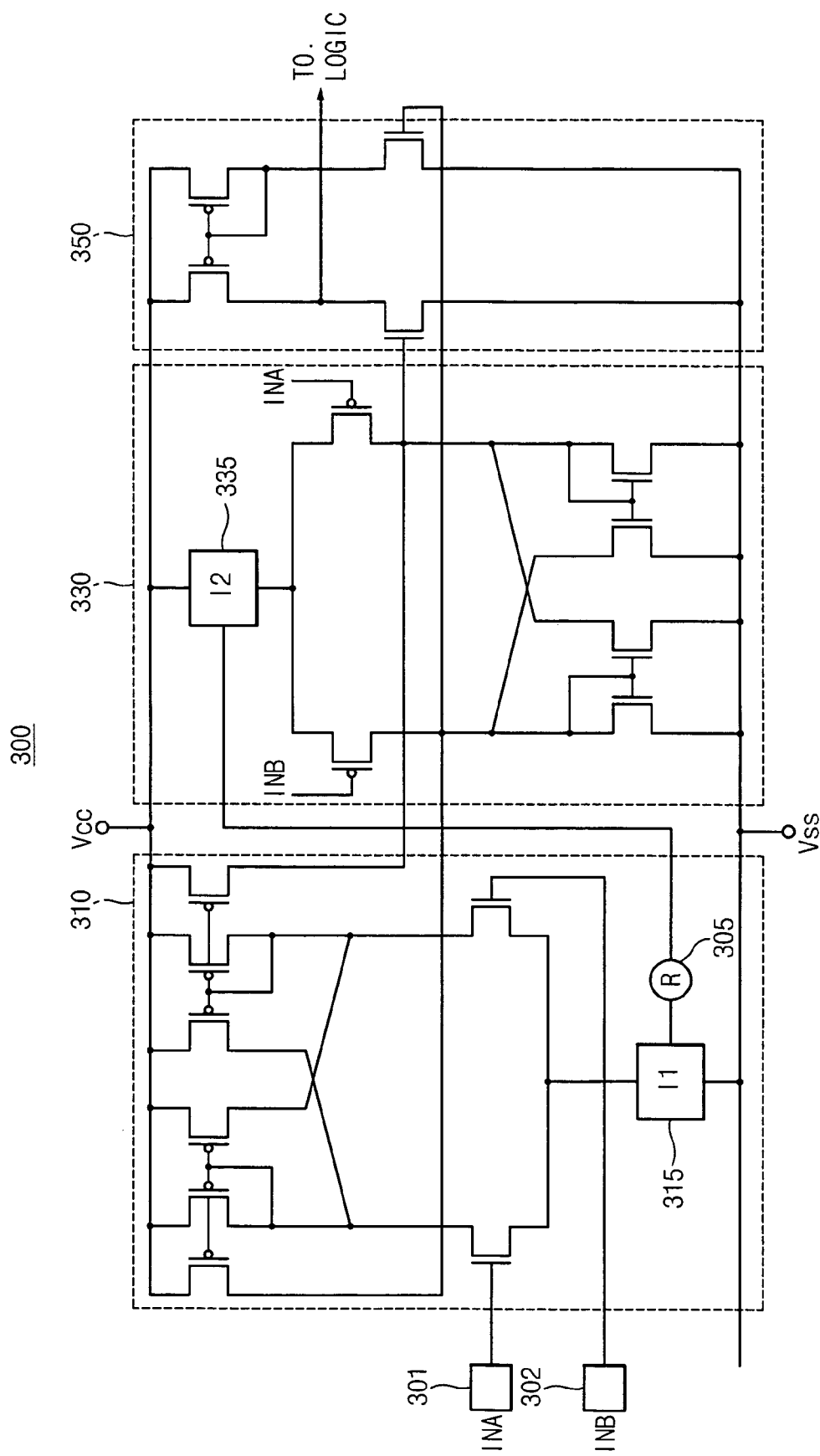
FIG. 3 is a circuit diagram illustrating a conventional rail-to-rail LVDS input buffer.

Referring to FIG. 4A, the operation of the LVDS transmitter 113 may be explained identically to the operation of the LVDS transmitter 113 of FIG. 2. The LVDS transmitter 113 has four groups each of which has seven channels, totalling twenty eight channels. The serializer 210 converts low speed parallel data of twenty eight channels to four high speed serial data streams. Thus, an LVDS output buffer 212a, 212b, 212c, or 212d can handle a group of seven channels. A clock generating unit 220 receives the clock signal of the LVDS transmitter 113 and generates a clock signal for the serializer 210 and the LVDS output buffers 212a, 212b, 212c, and 212d. The clock generating unit 220 may be PLL or DLL which includes a voltage controlled oscillator with an output frequency controlled by a control voltage.

Four LVDS input buffers 401a, 401b, 401c, and 401d (collectively referred to as 401) receive the data transmitted from the four LVDS output buffer 212a, 212b, 212c, and 212d of the LVDS transmitter 113. The operating frequency of the above mentioned LVDS input buffers 401a, 401b, 401c, and 401d is identical to that of the LVDS output buffers 212a, 212b, 212c, and 212d of FIG. 4A. The deseriallizer 420 converts four high speed serial data streams received by the four LVDS input buffers 401 to low speed parallel data of twenty eight channels. The LVDS receiver 400 also includes a clock generating unit 440. The clock generating unit 440 may be PLL or DLL, and may include a voltage controlled oscillator with an output frequency controlled by a control voltage.

The clock generating unit 220 in the LVDS transmitter 113 and the clock generating unit 440 in the LVDS receiver 400 may communicate with each other via a clock output LVDS buffer 221 and a clock input LVDS buffer 441 so that both the clock generating units 220 and 440 may generate clock signals synchronized with each other.

However, compared to the LVDS receiver 131 in FIG. 2, the LVDS receiver 400 further includes a control path 410 to control an amount of operating current of the LVDS input buffers 401. A control voltage of a voltage controlled oscillator (VCO) 530 (refer to FIG. 5) included in the clock generating unit 440 of the LVDS receiver 400 is supplied to a bias circuit 750 via the control path 410. The bias circuit 750 generates bias voltages 761 and 762 (refer to FIGS. 7A and 7B) to control current of the current sources 315 and 335 of differential amplifiers 310 and 330 of FIG. 8 in the LVDS input buffers 401. For example, the current sources 315 and 335 of FIG. 8 may be voltage controlled current source (VCCS).

As described above, the clock generating unit 440 may be PLL or DLL, which may include a voltage controlled oscillator. When a PLL is used as the clock generating unit 440, the control voltage may be obtained from a control voltage 525 (refer to FIG. 5) of the voltage controlled oscillator 530 included in the clock generating unit 440, as explained below.

Figure 4B:
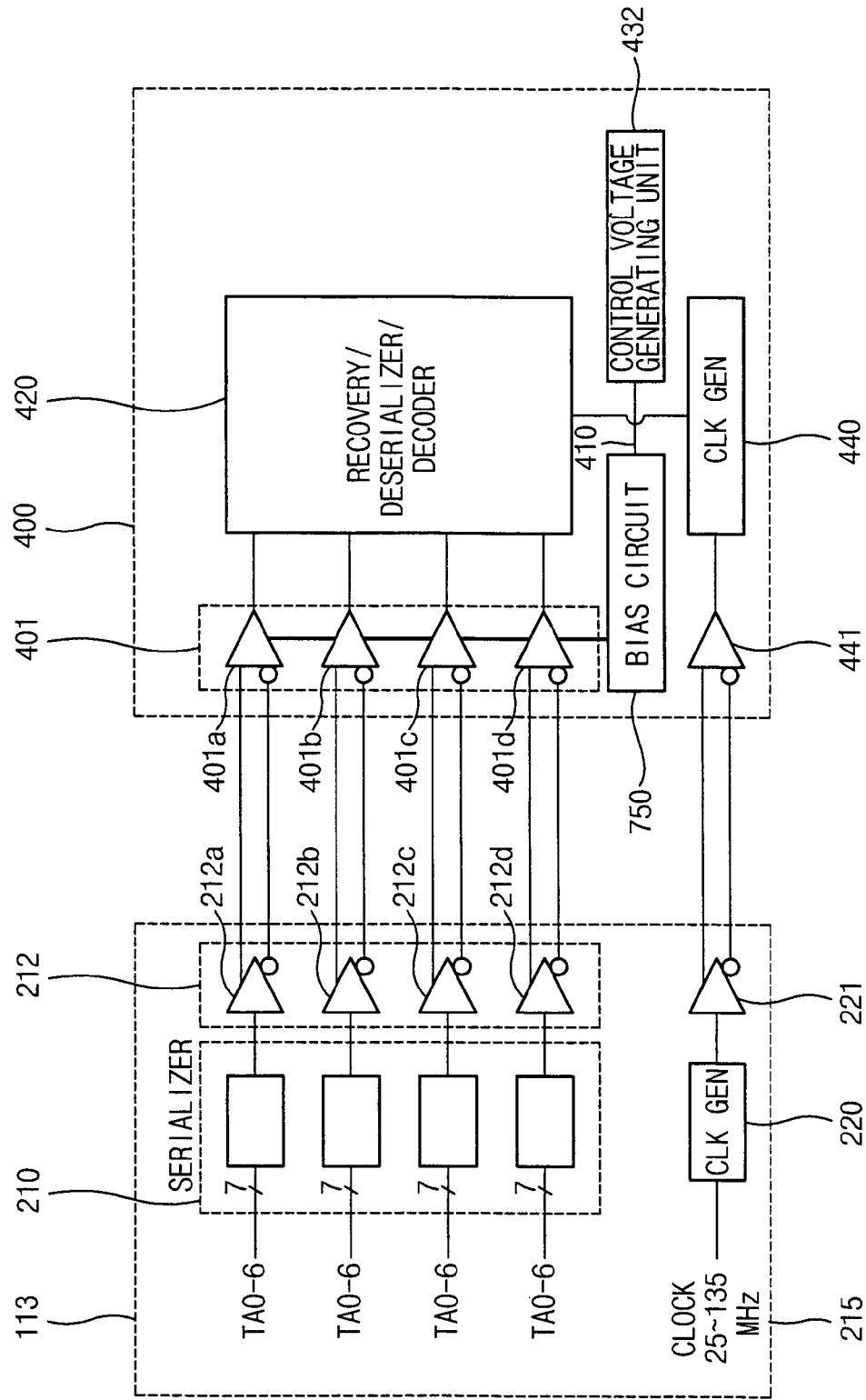
FIG. 4B is a block diagram showing an LVDS transmitter and an LVDS receiver according to another exemplary embodiment of the present invention.

FIG. 4B is a block diagram showing an LVDS transmitter and an LVDS receiver according to another exemplary embodiment of the present invention.

Referring to FIG. 4B, the LVDS receiver 400 may include a clock generating unit 440, a control voltage generating unit 432, a bias circuit 750, input buffers 401, and a deserializer 420. The control voltage generating unit 432 may generate a control voltage based on a value of a register which may be set by external commands. The bias circuit 750 generates bias voltages 761 and 762 (refer to FIGS. 7A and 7B) to control the current of the current sources 315 and 335 of the differential amplifiers 310 and 330 of FIG. 8.

Figure 5:
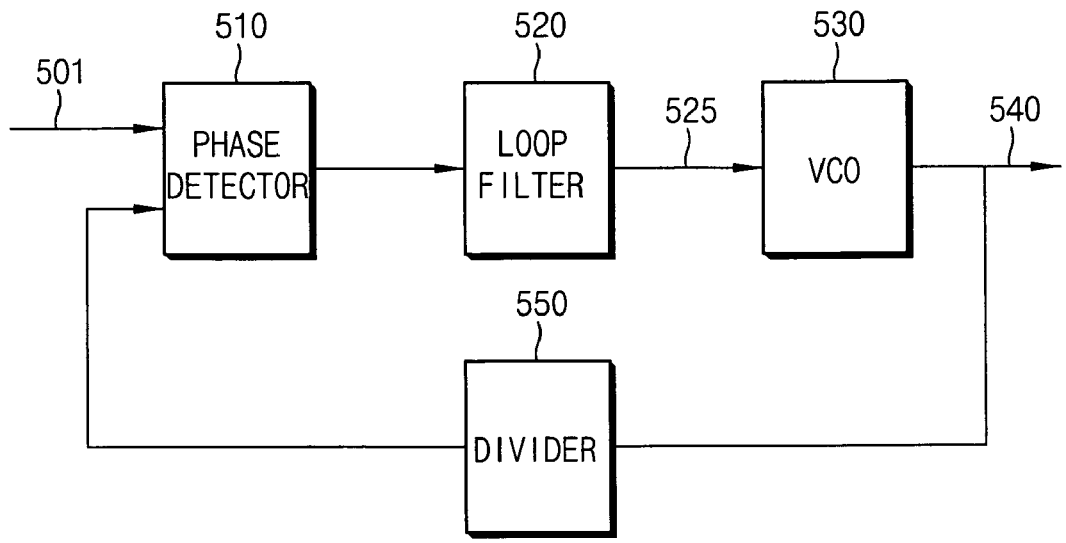
FIG. 5 is a block diagram showing an example of a Phase Locked Loop.

FIG. 5 is a block diagram showing an example of a Phase Locked Loop that may be used as the clock generating unit 440. Referring to FIG. 5, a PLL includes a phase detector 510, a loop filter 520, a voltage controlled oscillator 530, and a frequency divider 550. The frequency divider 550 is in a feedback loop that feeds back an output of the voltage controlled oscillator 530 to one of inputs of the phase detector 510. The other input of the phase detector is an input clock 501 having a reference frequency. The phase detector 510 compares the output of the voltage controlled oscillator 530 with the reference frequency of the input clock 501. The phase detector 510 generates a control signal corresponding to the phase difference between the phase of the output of the voltage controlled oscillator 530 and the phase of the reference frequency of the input clock 501. A control signal generated by the phase detector 510 is filtered by the loop filter 520 so that the loop filter 520 converts the control signal into a control voltage 525 for the voltage controlled oscillator 530. The control voltage 525 may have a substantial DC voltage level.

The voltage controlled oscillator 530 generates an output clock 540 having a frequency substantially proportional to the control voltage. The control voltage 525 is substantially proportional to the output frequency of the output clock 540. Thus, the control voltage 525 may be substantially proportional to the operating frequency of the LVDS input buffers 401. In other words, the clock signal 540 tracks the frequency of the data received by the LVDS input buffers 401.

Figure 6:
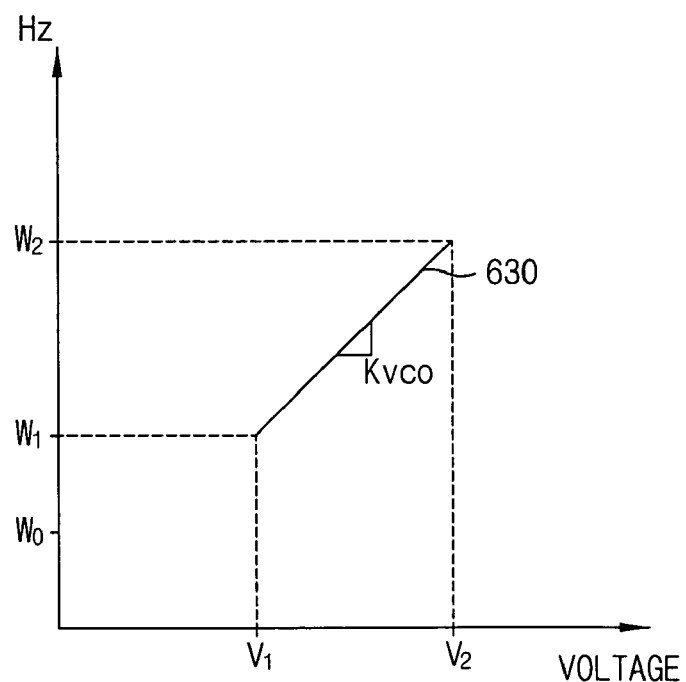
FIG. 6 is a graph showing a relationship between the control voltage of PLL and the output frequency of PLL.

FIG. 6 is a graph showing a relationship between the control voltage of the PLL and the output frequency of the PLL.

Referring to FIG. 6, a horizontal axis of the graph represents the control voltage 525 generated by the loop filter 520 and a vertical axis of the graph represents the output frequency of the output clock 540 of the voltage controlled oscillator 530. When the control voltage 525 varies in a range from V1 to V2, the output frequency varies in a range from $W_1$ to $W_2$, and linearly proportional to the control voltage 525. Consequently, the relationship between the control voltage 525 and the output frequency is characterized by $K_{VCO}$, which represents a slope of the straight line 630 in FIG. 6. However, in practical applications, the relationship between the control voltage 525 and the output frequency 540 may be nonlinear. Nevertheless, since the control voltage 525 is substantially linearly proportional to the output frequency of the output clock 540, the control voltage 525 may be used to control the amount of current supplied to the LVDS input buffers 401 in FIG. 4.

Figure 7A:
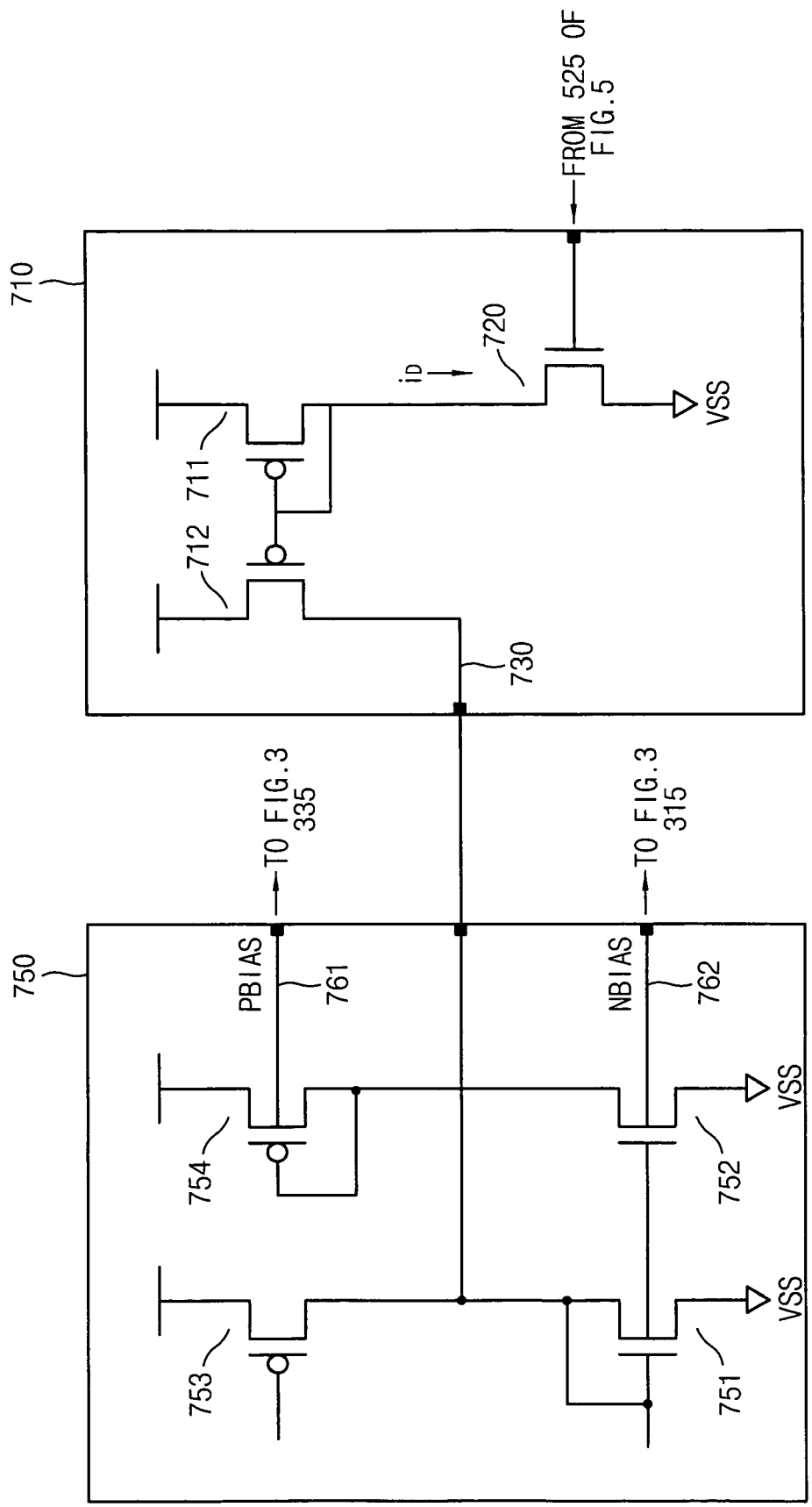
FIG. 7A is a circuit diagram showing an example of a bias circuit for generating current proportional to a square of the control voltage.
Figure 8:
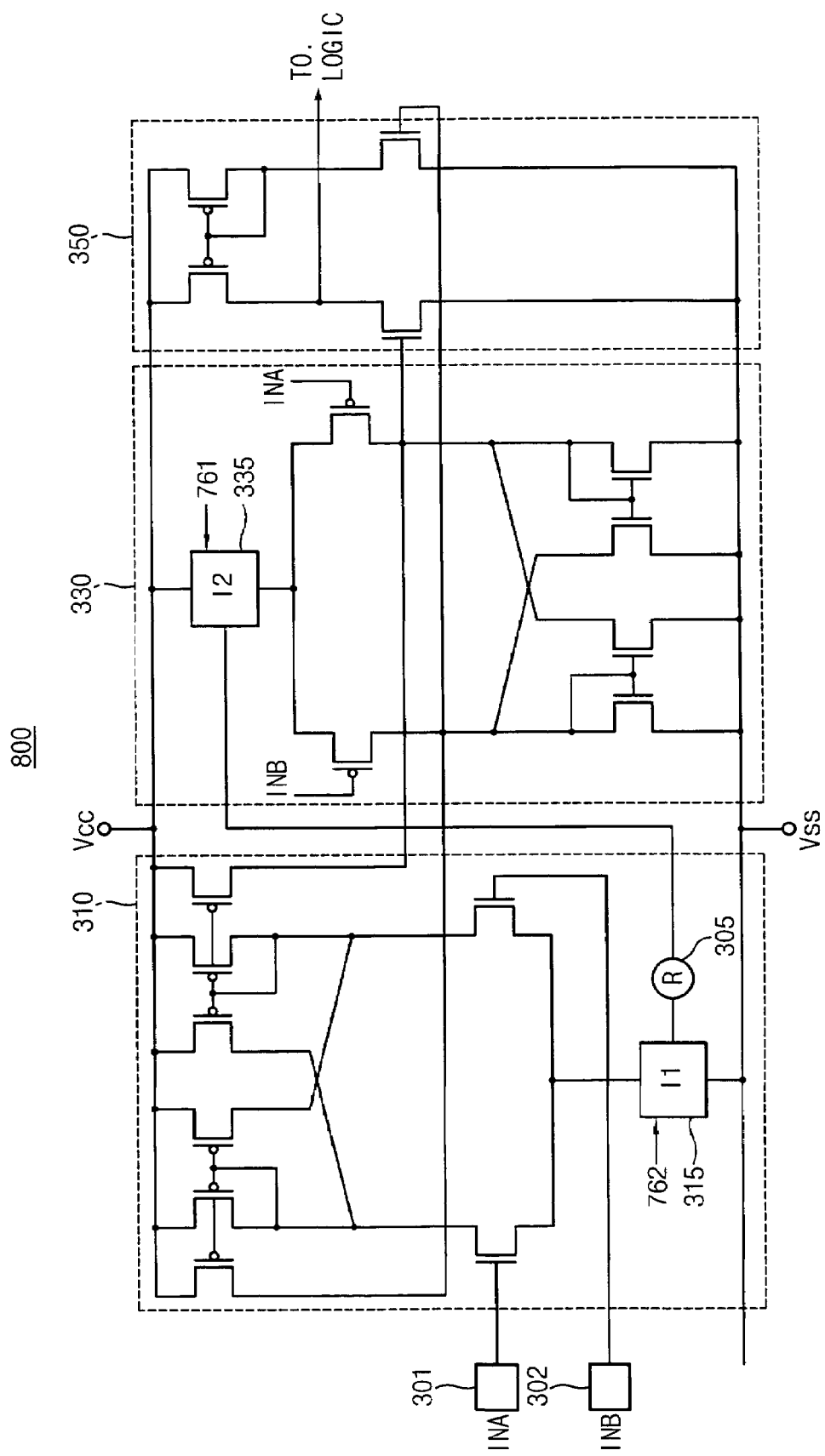
FIG. 8 is a circuit diagram illustrating a rail-to-rail LVDS input buffer according to an exemplary embodiment of the present invention.

FIG. 7A is a circuit diagram showing an example of a bias circuit generating a current proportional to the square of the control voltage.

Referring to FIG. 7A, 710 represents a voltage-to-current converting circuit for the clock generating unit 440 of FIGS. 4A and 4B. For example, the voltage-to-current converting circuit may be included in the clock generating unit 440. Alternatively, the voltage-to-current converting circuit may be externally coupled to the clock generating unit 440. The control voltage 525 is input to a gate of an input transistor 720. The input transistor 720 outputs a drain current $i_D$ proportional to the square of the control voltage 525 according to the square law of a gate-source voltage $V_{GS}$ and a drain-source current $i_D$ in a MOS transistor. A current mirror that includes transistors 711 and 712 generates a mirror current 730 of the current $i_D$ and provides the mirror current 730 to the bias circuit 750 of the LVDS input buffers side in FIGS. 4A and 4B. The bias circuit 750 converts the mirror current 730 to a voltage at the drain and gate of a diode-connected transistor 751. The relationship between the mirror current 730 and the gate-source voltage $V_{GS}$ of the diode-connected transistor 751 follows the square law described above. Thus, the gate voltage of the diode-connected transistor 751 is linearly proportional to the control voltage 525. In addition, the bias voltages 761 and 762 are substantially proportional to the control voltage 525.

The bias voltage 761 is generated at the gate of a transistor 754 based on the current $i_D$ flowing through a transistor 752 with its gate connected to the gate of the transistor 751. The bias voltage 762 is generated at the gate of the transistor 752 and is identical to the gate voltage of the transistor 751. The bias voltage 761 controls the amount of the current supplied to the P type differential amplifier 330 of the LVDS input buffers 401 and the bias voltage 762 controls the amount of the current supplied to the N type differential amplifier 310 of the LVDS input buffers 401. For example, referring to FIG. 8, the bias voltage 761 is inputted to the current source 335 and the bias voltage 762 to the current source 315 to control the amount of the currents supplied by the respective current sources 315 and 335.

Because the bias voltage 761 is substantially linearly proportional to the control voltage 525 and the bias voltage 762 is substantially linearly inversely proportional to the control voltage 525, the current sources 315 and 335 generate the output current substantially proportional to the square of the control voltage 525 based on the bias voltages 761 and 762.

Figure 7B:
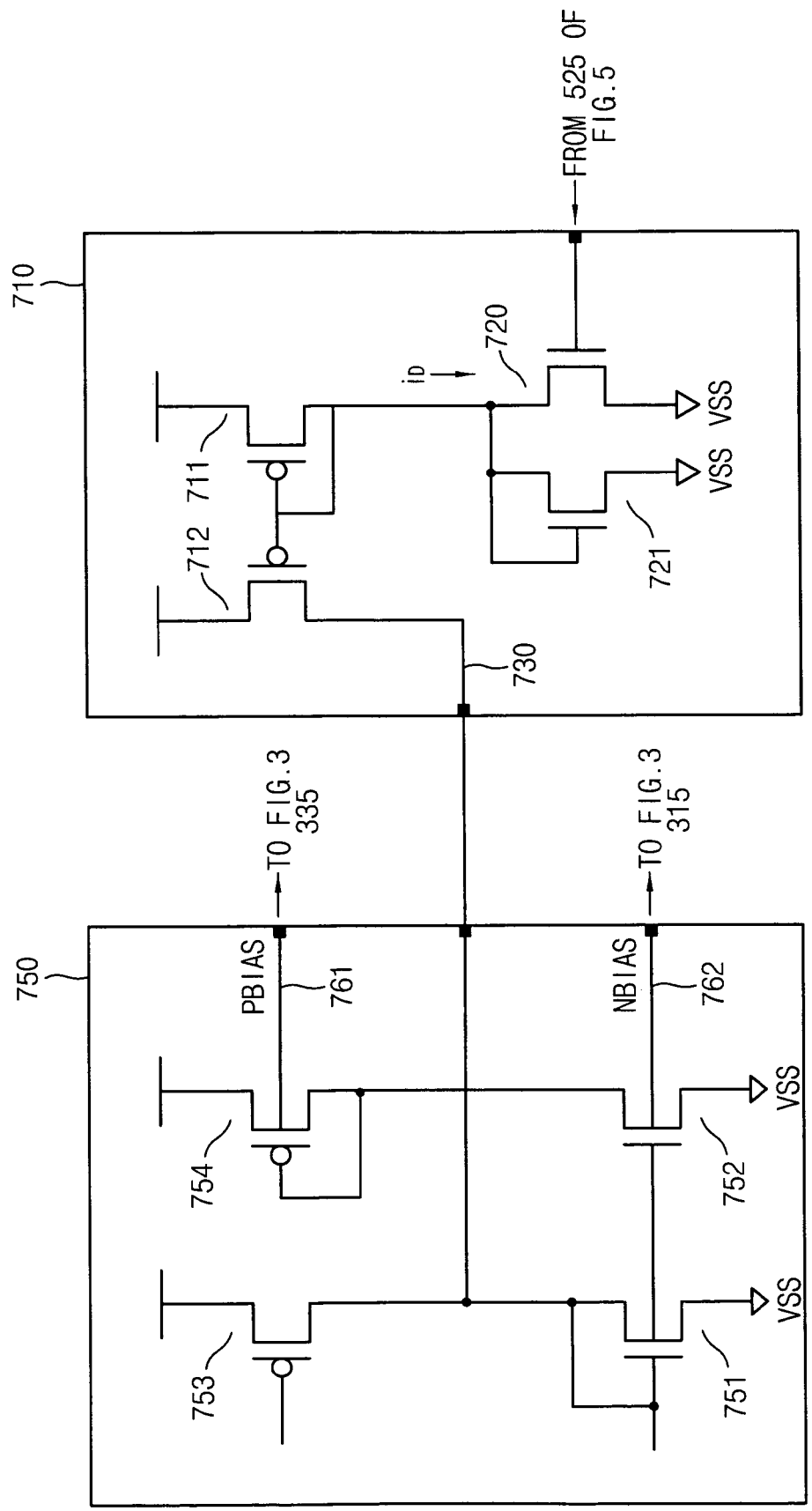
FIG. 7B is a circuit diagram showing an example of a bias circuit for generating current linearly proportional to the control voltage.

FIG. 7B is a circuit diagram showing a bias circuit according to another exemplary embodiment of the present invention.

Referring to FIG. 7B, compared with FIG. 7A, a diode-connected transistor 721 is added between a drain of the input transistor 720 and power voltage VSS so that the current $i_D$ may be linearly proportional to the control voltage 525. The power voltage VSS may be a negative voltage level or a ground level. The diode-connected transistor 721 lowers a drain voltage of the input transistor 720 nearly to the VSS voltage level, and allows the input transistor 720 to operate nearly in a deep-triode region. In the deep-triode region, since the relationship between the gate-source voltage $V_{GS}$ and the drain-source current $i_D$ of a MOS transistor are approximately linear, the current $i_D$ flowing through the transistor 720 is maintained to be linearly proportional to the control voltage 525. The current mirror comprised of the transistor 711 and 712 generates a mirror current 730 of the current $i_D$ and provides the mirror current 730 to the bias circuit 750 of the LVDS input buffer side. The bias circuit 750 converts the mirror current 730 to a voltage at the gate of transistor 751. The relationship between the mirror current 730 and the gate voltage of the transistor 751 follows the square law describe above. Thus, the gate voltage of transistor 751 is proportional to the square of the control voltage 525.

The bias voltage 761 and 762 of FIG. 7B are generated identically to the bias voltage 761 and 762 of FIG. 7A. However, since the bias voltage 761 is proportional to the square of the control voltage 525 and the bias voltage 762 is inversely proportional to the square of the control voltage 525, the first current source 315 and the second current source 335 may generate a current linearly proportional to the control voltage 525.

The amount of the current supplied to the differential amplifiers 310 and 330 of the LVDS input buffers may be controlled based on an analog control method in which the control voltage 525 for controlling the frequency of the output clock of the PLL or DLL is used to control the amount of the current.

According to another exemplary embodiment of the present invention, an external signal can be used to control the amount of the current supplied to the differential amplifiers 310 and 330 of the LVDS input buffers. For example, a control voltage generating unit 432 may be coupled to the scaler 112 in FIG. 1 so that the control voltage generating unit 432 may generate the control voltage for controlling the amount of the current in response to a screen resolution and a color depth set by the scaler 112. For another example, the LVDS receiver may have its own register which may be set by external commands. A value of the register may control the control voltage generating unit 432 and/or the bias circuit 750.

According to above exemplary embodiments of the present invention, an LVDS receiver can reduce the amount of the current consumed in the LVDS input buffers by controlling the amount of the current supplied to the differential amplifier(s) included in the LVDS input buffers. Thus, when the LVDS receiver is used in battery-powered device such as a laptop computer and a PDA, the battery life span may be prolonged.

While the exemplary embodiments of the present invention and their advantages have been described in detail, it should be understood that various changes, substitutions, and alterations may be made herein without departing from the scope of the invention.

What is claimed is:

1. A receiver comprising:
    a plurality of data input buffers, each data input buffer configured to receive corresponding data transmitted from a transmitter, where the data is parallel data serialized into serial data;
    a clock input buffer configured to receive a clock input signal transmitted from the transmitter;
    a clock generating unit configured to generate a clock signal in response to the clock input signal, the clock generating unit including a voltage controlled oscillator configured to generate the clock signal that tracks a frequency of the data received by the input buffers based on a control voltage applied to the voltage controlled oscillator;
    a bias circuit configured to control current sources for supplying current to the data input buffers based on the control voltage; and
    a deserializer configured to convert the data received by each of the data input buffers into the corresponding parallel data in response to the clock signal.

2. The receiver according to claim 1, wherein the data input buffers have a rail-to-rail architecture.

3. The receiver according to claim 1, wherein the clock generating unit includes a phase locked loop (PLL).

4. The receiver according to claim 1, wherein the clock generating unit includes a delay locked loop (DLL).

5. The receiver according to claim 1, wherein the bias circuit controls the current sources so that the current sources supply the current substantially proportional to a square of the control voltage.

6. The receiver according to claim 1, wherein the bias circuit controls the current sources so that the current sources supply the current substantially linearly proportional to the control voltage.

7. The receiver according to claim 1, wherein the receiver is a low voltage differential signaling (LVDS) receiver and the data input buffers are LVDS buffers.

8. A receiver comprising:
    a plurality of data input buffers, each data input buffer configured to receive corresponding data transmitted from a transmitter, where the data is parallel data serialized into serial data;
    a clock input buffer configured to receive a clock input signal transmitted from the transmitter;
    a clock generating unit configured to generate a clock signal in response to the clock input signal;
    a control voltage generating unit configured to generate a control voltage corresponding to a frequency of the data received by the data input buffers;
    a bias circuit configured to generate at least one bias voltage for controlling at least one current source that supplies current to the data input buffers in response to the control voltage; and
    a deserializer configured to convert the data received by each of the data input buffers into the corresponding parallel data in response to the clock signal.

9. The receiver according to claim 8, wherein the receiver is a low voltage differential signaling (LVDS) receiver and the data input buffers are LVDS buffers.

10. The receiver according to claim 8, wherein each data input buffer comprises:
    a differential amplifier to receive a corresponding input signal; and a corresponding current source of the at least one current source, the corresponding current source to supply current to the differential amplifier in response to the control voltage independent of the corresponding input signal.

11. The receiver according to claim 8, further comprising a register configurable by external commands, wherein the control voltage generating unit is configured to generate the control voltage in response to a value stored in the register.

12. The receiver according to claim 8, wherein the bias circuit controls the at least one current source so that the current source supplies the current either substantially proportional to a square of the control voltage or substantially linearly proportional to the control voltage.

13. A method of operating a receiver comprising:
    receiving data transmitted from a transmitter to the receiver in a plurality of data input buffers, where the data associated with each data input buffer is parallel data serialized into serial data;
    receiving a clock input signal transmitted from the transmitter to the receiver in a clock input buffer;
    generating a clock signal that tracks a frequency of the data received via the data input buffers in response to the clock input signal;
    generating a control voltage corresponding to the frequency of the data;
    controlling current supplied to differential amplifiers of the data input buffers based on the control voltage;
    operating the differential amplifiers based on the controlled current; and
    converting the data received via each of the data input buffers into the corresponding parallel data in response to the clock signal.

14. The receiver according to claim 13, wherein the receiver is a low voltage differential signaling (LVDS) receiver and the data input buffers are LVDS buffers.

15. The method of claim 13, wherein the clock signal is generated by a phase locked loop (PLL).

16. The method of claim 15, wherein the control voltage corresponds to a control voltage of a voltage controlled oscillator of the PLL.

17. The method of claim 13, wherein the clock signal is generated by a delay locked loop (DLL).

18. The method of claim 17, wherein the control voltage corresponds to a control voltage of a voltage controlled oscillator of the DLL.

19. The method of claim 13, wherein the controlling current comprises supplying the current proportional to a square of the control voltage to the differential amplifiers of the data input buffers.

20. The method of claim 13, wherein the controlling current comprises supplying the current substantially linearly proportional to the control voltage to the differential amplifiers of the data input buffers.

21. The receiver according to claim 1, wherein
    the clock input buffer is configured to receive the clock input signal independent of the control voltage.

22. The receiver according to claim 1, wherein:
    the clock generating unit further comprises a voltage-to-current converting circuit configured to generate a control current in response to the control voltage; and
    the bias circuit is configured to provide the current sources with bias voltage corresponding to the control current.

23. The receiver according to claim 22, wherein the voltage-to-current converting circuit comprises:
    an input transistor having a gate to which the control voltage is applied; and
    a current mirror coupled to a drain of the input transistor to generate the control current substantially proportional to a square of the control voltage.

24. The receiver according to claim 22, wherein the voltage-to-current converting circuit comprises:
    an input transistor having a gate to which the control voltage is applied;
    a diode connected transistor coupled in parallel with the input transistor; and
    a current mirror commonly coupled to a drain of the input transistor and a drain of the diode connected transistor to generate the control current substantially linearly proportional to the control voltage.

25. The receiver according to claim 21, wherein:
    each data input buffer includes a corresponding current source of the current sources; and
    the bias circuit is configured to control the current source of each input buffer in response to the control voltage.

* * * * *

UNITED STATES PATENT AND TRADEMARK OFFICE
CERTIFICATE OF CORRECTION

PATENT NO. : 7,667,546 B2  Page 1 of 1
APPLICATION NO. : 11/173485
DATED : February 23, 2010
INVENTOR(S) : Dae-Gyu Kim It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Seventh Day of December, 2010

David J. Kappos
*Director of the United States Patent and Trademark Office*